United States Patent [19]
Kimura et al.

[11] Patent Number: 4,763,997
[45] Date of Patent: * Aug. 16, 1988

[54] VIEWFINDER OPTICAL SYSTEM OF INVERTED GALILEAN TYPE WITH GREAT MAGNIFICATION

[75] Inventors: Kazuo Kimura; Taro Shibuya, both of Sakai, Japan

[73] Assignee: Minolta Camera Kabushiki Kaisha, Osaka, Japan

[*] Notice: The portion of the term of this patent subsequent to Mar. 17, 2004 has been disclaimed.

[21] Appl. No.: 915,221

[22] Filed: Oct. 2, 1986

[30] Foreign Application Priority Data

Oct. 3, 1985 [JP] Japan ............... 60-151702[U]

[51] Int. Cl.$^4$ ............... G02B 9/04; G02B 3/02
[52] U.S. Cl. ............... 350/410; 350/432
[58] Field of Search ............... 350/410, 432, 453, 444, 350/479

[56] References Cited

U.S. PATENT DOCUMENTS 2,994,257  8/1961  Papke .
4,650,293  3/1987  Kimura et al. ............... 350/432

FOREIGN PATENT DOCUMENTS 55-113522  8/1955  Japan .
33-7043    8/1958  Japan .
50-87027   7/1975  Japan .
59-23330   2/1984  Japan .

Primary Examiner—John K. Corbin
Assistant Examiner—Rebecca D. Gass
Attorney, Agent, or Firm—Price, Gess & Ubell

[57] ABSTRACT

The present invention provides a viewfinder optical system of inverted Galilean type which has a great magnification relative to the diameter of the objective lens without increasing the number of parts. The viewfinder optical system consists of, from the object side to the eye side, an objective lens component having a negative refractive power and an eyepiece lens component having a positive refractive power. The eyepiece lens component has a convex surface at the eye side. The viewfinder optical system fulfills the following conditions:

$0.4L < d_3 < 0.85L$
$-1.4 < L/R_4 < -0.8 \quad R_4 < 0$
$0.35 < |R_2/R_4| < 0.65$ wherein:

L represents the total length of the whole viewfinder optical system;
$d_3$ represents the axial thickness of the eyepiece lens component;
$R_2$ represents the radius of curvature of the eye side surface of the objective lens component; and
$R_4$ represents the radius of curvature of the eye side surface of the eyepiece lens component.

2 Claims, 4 Drawing Sheets

VIEWFINDER OPTICAL SYSTEM OF INVERTED GALILEAN TYPE WITH GREAT MAGNIFICATION

BACKGROUND OF THE INVENTION

1. Field of the Invention

The present invention relates to a viewfinder optical system for a camera, and more particularly to a viewfinder optical system of an inverted Galilean type which has great magnification relative to the diameter of the objective lens component.

2. Description of the Prior Art

Most viewfinder optical systems of recent lens-shutter cameras are of the inverted Galilean type. One example of this type is shown in FIG. 5. It includes basically two lens units with one lens component for each consisting of, from the object side, an objective lens component (Lo) having a negative refractive power and an eyepiece lens component (Le) having a positive refractive power. The construction is very simple and advantageously inexpensive. This viewfinder optical system of an inverted Galilean type, however, has a disadvantage in that the diameter of the objective lens component becomes greater, as the magnification becomes greater. It is a recent trend to incorporate a flash device, a range finder and so on into a lens-shutter camera near the viewfinder, causing the decrease in the space for the viewfinder system. As the diameter of the objective lens component should be kept small, the magnification of the viewfinder optical system tends to decrease.

In order to make the magnification greater without widening the space for the viewfinder optical system, it has been proposed to arrange a thick parallel glass block (Lb) between the objective lens component (Lo) and the eyepiece lens component (Le). Such a construction is shown in FIG. 6. With this construction, the total length of the whole viewfinder optical system becomes shorter while the magnification becomes greater. But the use of the parallel glass block (Lb) causes an increase in the number of parts, and thus an increase in manufacturing costs.

SUMMARY OF THE INVENTION

A main object of the present invention is to provide an improved viewfinder optical system of an inverted Galilean type.

Another object of the present invention is to provide a viewfinder optical system of an inverted Galilean type which has a great magnification relative to the diameter of the objective lens component without an increase in the number of parts.

Still another object of the present invention is to provide a viewfinder optical system of an inverted Galilean type, whose magnification is in the range of 0.4 to 0.7.

A further object of the present invention is to provide a viewfinder optical system with aberrations well corrected.

To achieve these objects, a viewfinder optical system of an inverted Galilean type of the present invention consists of, from the object side to the eye side, an objective lens component having a negative refractive power, and an eyepiece lens component having a positive refractive power. The eyepiece lens component has a convex surface at the eye side.

The viewfinder optical system of the present invention fulfills the following conditions:

$0.4L < d_3 < 0.85L$
$-1.4 < L/R_4 < -0.8 \ R_4 < 0$
$0.35 < |R_2/R_4| < 0.65$ wherein L represents the total length of the whole viewfinder optical system, $d_3$ represents the axial thickness of the eyepiece lens component, $R_2$ represents the radius of curvature of the eye side surface of the objective lens component and $R_4$ represents the radius of curvature of the eye side surface of the eyepiece lens component.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Figure 1:
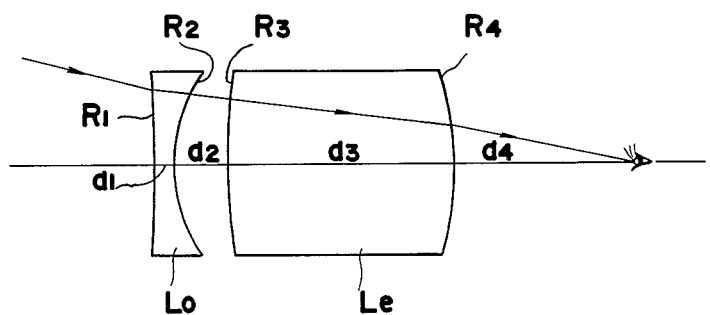
FIG. 1 is a cross-sectional view showing appearance of the viewfinder optical system according to first to third embodiments of the present invention.
Figure 2A:
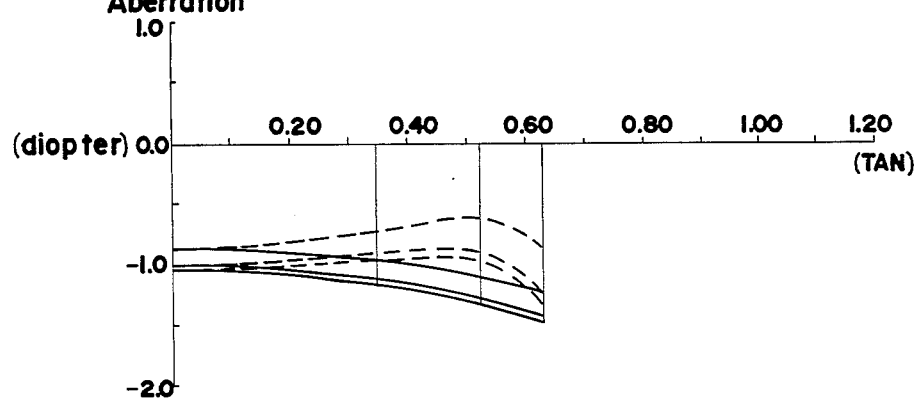
FIGS. 2A and 2B represent astigmatism and distortion of an object image of the embodiment 1.
Figure 2B:
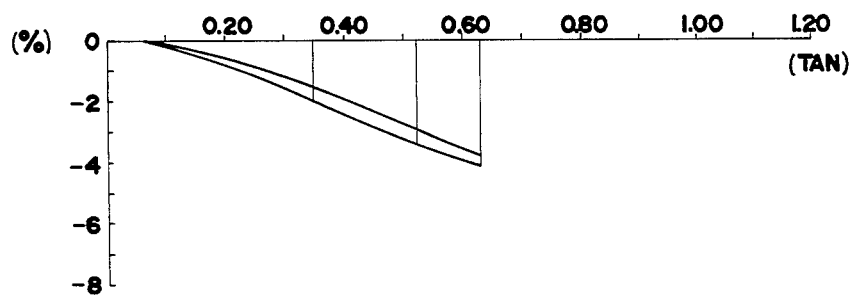
Figure 3A:
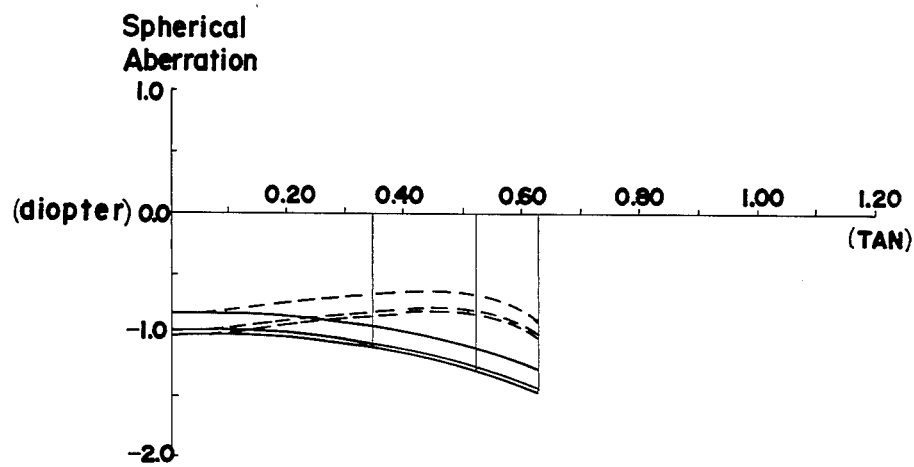
FIGS. 3A and 3B represent astigmatism and distortion of an object image of the embodiment 2.
Figure 3B:
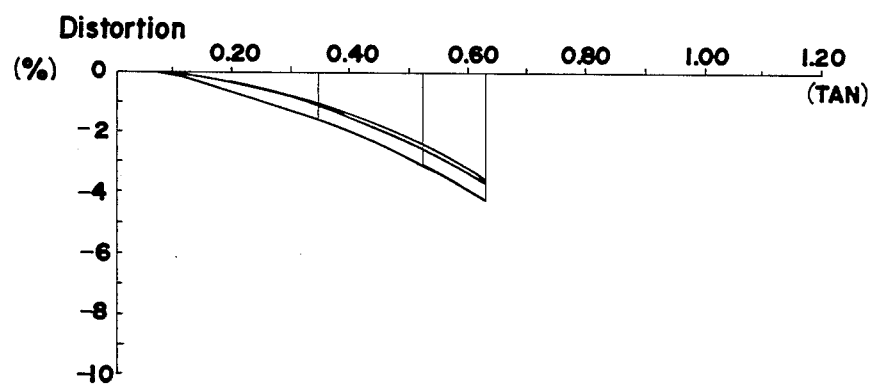
Figure 4A:
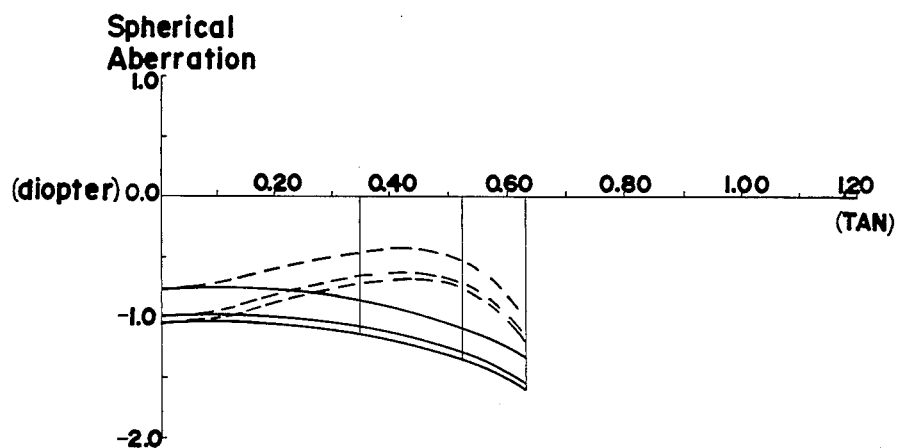
FIGS. 4A and 4B represent astigmatism and distortion of an object image of the embodiment 3.
Figure 4B:
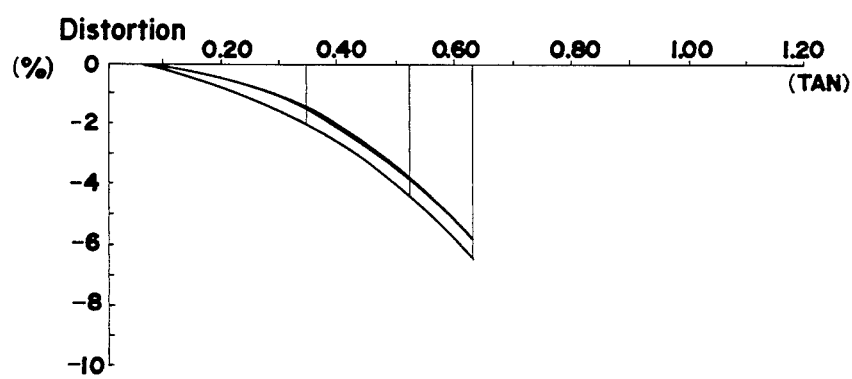

The following description is provided to enable any person skilled in the optical and camera field to make and use the invention and sets forth the best modes contemplated by the inventors for carrying our invention. Various modifications, however, will remain readily apparent to those skilled in the art, since the generic principles of the present invention have been defined herein specifically to provide a relatively economical and easily manufactured finder optical system. The derivation of the formulas and the relation of the powers set forth herein can be accomplished with the assistance of a computer. The present invention represents the parameters of a compromise balance of acceptable aberrations which can be relatively easily manufactured to provide a low cost viewfinder optical system for utilization with a lens-shutter camera.

In the drawings, schematic cross sectional views disclose the position of the lens components. Values of the radii of curvature and axial distances for each lens component and air space are provided in the accompanying tables set forth herein. The schematic views of the present and the conventional viewfinder systems follows the normal conventions of an object at the left-hand side of the drawing and an eye at the right-hand side.

As shown in FIG. 1, the present invention provides a viewfinder optical system of inverted Galilean type which consists of from the object side to the eye side, an objective lens component (Lo) having a negative refractive power, and an eyepiece lens component (Le)

having a positive refractive power. Eyepiece lens component has a convex surface ($R_4$) at the eye side. The viewfinder optical system of this invention fulfills the following conditions:

(1) $0.4L < d_3 < 0.85L$
(2) $-1.4 < L/R_4 < -0.8$  $R_4 < 0$
(3) $0.35 < |R_2/R_4| < 0.65$ wherein, L represents the total length of the whole viewfinder optical system, $d_3$ represents the axial thickness of the eyepiece lens component, $R_2$ represents the radius of curvature of the eye side surface of the objective lens component (Lo), and $R_4$ represents the radius of curvature of the eye side surface of the eyepiece lens component (Le).

In the present invention the eye side surface of the eye piece lens component (Le) has a positive refractive power and the positive refractive power of the viewfinder optical system of inverted Galilean type is mainly afforded by this eye side surface of the eye piece lens component.

The condition (1) defines the thickness of the eye piece lens component (Le). If the upper limit of condition (1) is violated, the objective lens component (Lo) touches the eyepiece lens component (Le), and the viewfinder optical system cannot be constructed. On the other hand, if the lower limit of condition (1) is violated, the magnification of the viewfinder optical system cannot be made great as desired.

The condition (2) defines the radius of curvature of the eye side surface ($R_4$) of the eyepiece lens component (Le). If the upper limit of condition (2) is violated, the diopter becomes plus, so that it becomes impossible to observe the object image through the viewfinder. On the other hand, if the lower limit of the condition (2) is violated, the magnification of the viewfinder optical system cannot be made great relative to the diameter of the objective lens component.

The condition (3) defines the ratio of the radius of curvature of the eye side surface ($R_2$) of the objective lens component (Lo) to the radius of curvature of the eye side surface ($R_4$) of the eyepiece lens component (Le). If the upper limit of the condition (3) is violated, the spherical aberration increases. On the other hand, if the lower limit of the condition (3) is violated, the distortion increases.

Figure 5:
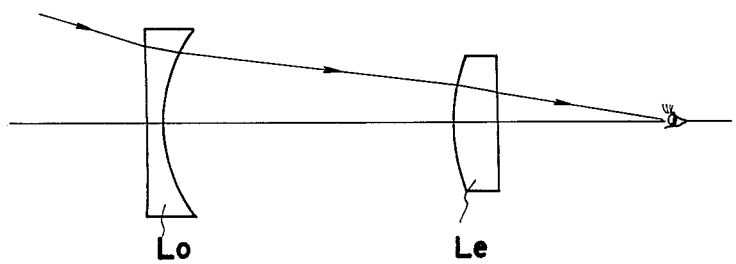
FIG. 5 is a sectional view of a conventional finder optical system of inverted Galilean type.
Figure 6:
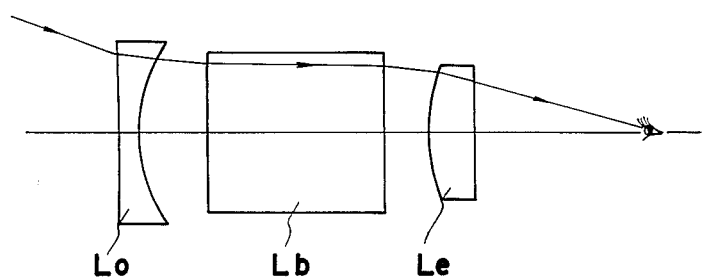
FIG. 6 is a sectional view of another conventional finder optical system of inverted Galilean type with a parallel glass block.

The following tables 2 to 4 disclose design parameters of the first to third embodiments of the present invention, respectively, whereas the table 1 discloses those of one example of the conventional viewfinder optical system of an inverted Galilean type, which is shown in the FIG. 5. In the tables, R is the radius of curvature with respective to sub numbers indicating the surface of the lens component from the object side along the optical axis, D is the axial distance including both air spaces and actual thickness of the lens components, and N represents the refractive power of the lens components. The surface with the asterisk (*) is the aspheric, more particularly, oval surface, $\epsilon$ is aspheric coefficient.

TABLE 1

[example of the conventional viewfinder optical system]

| | radius of curvature (mm) | axial distance (mm) | refractive index |
|---|---|---|---|
| ($L_1$) | $R_1$ ∞ | | |
| | | $D_1$ 1.2 | $N_1$ 1.4914 |
| | $R_2$ 10.6 | | |
| $D_2$ 18.8 | | | |
| ($L_2$) | $R_3$ 50.0 | | |
| | | $D_3$ 4.5 | $N_2$ 1.4914 |

TABLE 1-continued

[example of the conventional viewfinder optical system]

| | radius of curvature (mm) | axial distance (mm) | refractive index |
|---|---|---|---|
| | $R_4$ −37.0 | | |
| $D_4$ 15.0 | | | |
| | eye | | | diopter = −1.0
magnification = 0.5

TABLE 2

[Embodiment 1]

| | radius of curvature (mm) | axial distance (mm) | refractive index |
|---|---|---|---|
| (Lo) | $R_1$ −150.0 | | |
| | | $D_1$ 1.2 | $N_1$ 1.4914 |
| | $R_2$ 10.9* | | |
| $D_2$ 5.0 | | | |
| (Le) | $R_3$ 50.0 | | |
| | | $D_3$ 18.3 | $N_2$ 1.4914 |
| | $R_4$ −24.0 | | |
| $D_4$ 15.0 | | | |
| | eye | | |

L = 24.5
d/L = 0.747
L/$R_4$ = 1.021
|$R_2/R_4$| = 0.45
diopter = −1.0
magnification = 0.58
$\epsilon$ = 0.48

TABLE 3

[Embodiment 2]

| | radius of curvature (mm) | axial distance (mm) | refractive index |
|---|---|---|---|
| (Lo) | $R_1$ 35.0 | | |
| | | $D_1$ 1.2 | $N_1$ 1.4914 |
| | $R_2$ 10.7 | | |
| | | $D_2$ 5.0 | |
| (Le) | $R_3$ −49.6 | | |
| | | $D_3$ 18.3 | $N_2$ 1.4914 |
| | $R_4$ −20.0 | | |
| $D_4$ 15.0 | | | |
| | eye | | |

L = 24.5
d/L = 0.747
L/$R_4$ = 1.225
|$R_2/R_4$| = 0.54
diopter = −1.0
magnification = 0.59

TABLE 4

[Embodiment 3]

| | radius of curvature (mm) | axial distance (mm) | refractive index |
|---|---|---|---|
| (Lo) | $R_1$ −50.0 | | |
| | | $D_1$ 7.5 | $N_1$ 1.4914 |
| | $R_2$ 8.2* | | |
| $D_2$ 5.0 | | | |
| (Le) | $R_3$ 25.5 | | |
| | | $D_3$ 12.0 | $N_2$ 1.4914 |
| | $R_4$ −20.0 | | |
| $D_4$ 15.0 | | | |
| | eye | | |

L = 24.5
d/L = 0.490
L/$R_4$ = 1.225
|$R_2/R_4$| = 0.41
diopter = −1.0
magnification = 0.55
$\epsilon$ = 0.23

Finally, explanation is given of the effects of the present invention. Assuming that the focal length of the picture taking lens f of the camera is 35 mm and that the field angle of the viewfinder 2ω in the horizontal direction is 54.4°, the diameter of the objective lens component in the respective embodiments is 16.28, 16.34 and 16.16 mm, respectively.

If the diameter of the objective lens component in the respective embodiments is standardized by 15.88 mm, i.e., the diameter of the objective lens component of the conventional example shown in FIG. 5, it is indicated that, the magnification of the viewfinder optical systems of the embodiments 1, 2 and 3 increase at 12%, 13% and 7%, respectively, compared with that of the conventional embodiment.

What is claimed is:

1. A viewfinder optical system of inverted Galilean type, consisting of two lens units with one lens component for each, consisting of from the object side to the eye side;

an objective lens component having a negative refractive power; and an eyepiece lens component having a positive refractive power, said eyepiece lens component having a convex surface at the eye side;

wherein the viewfinder optical system fulfills the following conditions;

$0.4L < d_3 < 0.85L$
$-1.4 < L/R_4 < -0.8 \ R_4 < 0$
$0.35 < |R_2/R_4| < 0.65$ wherein, L: the total length of the whole viewfinder optical system, $d_3$: the axial thickness of the eyepiece lens component, $R_2$: the radius of curvature of the eye side surface of the objective lens component, and $R_4$: the radius of curvature of the eye side surface of the eyepiece lens component.

2. A viewfinder optical system of inverted Galilean type, comprising an objective lens component and an eyepiece lens component represented by the following design parameters:

|  | radius of curvature (mm) | axial distance (mm) | refractive index |
|---|---|---|---|
| (Lo) | $R_1$ 35.0 | | |
|  | | $D_1$ 1.2 | $N_1$ 1.4914 |
|  | $R_2$ 10.7 | | |
|  | | $D_2$ 5.0 | |
| (Le) | $R_3$ −49.6 | | |
|  | | $D_3$ 18.3 | $N_2$ 1.4914 |
|  | $R_4$ −20.0 | | |
|  | | $D_1$ 15.0 | |
|  | eye | | |

$L = 24.5$
$d/L = 0.747$
$L/R_4 = 1.225$
$|R_2/R_4| = 0.54$
diopter $= -1.0$
magnification $= 0.59$ wherein:

L represents the total length of the whole viewfinder optical system;

$d_3$ represents the axial thickness of the eyepiece lens component;

$R_2$ represents the radius of curvature of the eye side surface of the objective lens component; and $R_4$ represents the radius of cuvature of the eye side surface of the eyepiece lens component.

* * * * *